（12）United States Patent
Alcazar et al.

(10) Patent No.: US 9,150,238 B2
(45) Date of Patent: Oct. 6, 2015

(54) SYSTEM AND METHOD FOR AUTOMATICALLY ADJUSTING A STEERING TILT POSITION

(75) Inventors: Javier A Alcazar, Royal Oak, MI (US); Dorel M. Sala, Troy, MI (US); Jenne-Tai Wang, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 462 days.

(21) Appl. No.: 13/487,857

(22) Filed: Jun. 4, 2012

(65) Prior Publication Data

US 2013/0325264 A1 Dec. 5, 2013

(51) Int. Cl.
*G05D 3/00* (2006.01)
*B62D 1/181* (2006.01)

(52) U.S. Cl.
CPC ................................ *B62D 1/181* (2013.01)

(58) Field of Classification Search
CPC ........................................................ B62D 1/181
USPC .............................................................. 701/49
See application file for complete search history.

(56) References Cited

U.S. PATENT DOCUMENTS

| 5,706,144 A  | * | 1/1998 | Brandin ........................... 701/49 |
| 2006/0208169 A1 | * | 9/2006 | Breed et al. .................... 250/221 |
| 2013/0013157 A1 | * | 1/2013 | Kim et al. ........................ 701/49 |

* cited by examiner

*Primary Examiner* — John Q Nguyen
*Assistant Examiner* — Anshul Sood
(74) *Attorney, Agent, or Firm* — Mickki D. Murray; Parks Wood LLC

(57) ABSTRACT

A system and method for detecting the position of the head and/or eye of a driver of an automobile and automatically adjusting the position of the steering wheel based on the head and/or eye position in order to provide the driver with an optimized view of the instrumentation panel and road. The system and method utilizes the vehicle parameters, driver parameters, and various settings to determine the proper position of the steering wheel including the height, proximity to driver, and tilt angle of the steering wheel. The system may also adjust the height and/or length of the steering column in order to adjust and provide the proper position of the steering wheel.

16 Claims, 7 Drawing Sheets

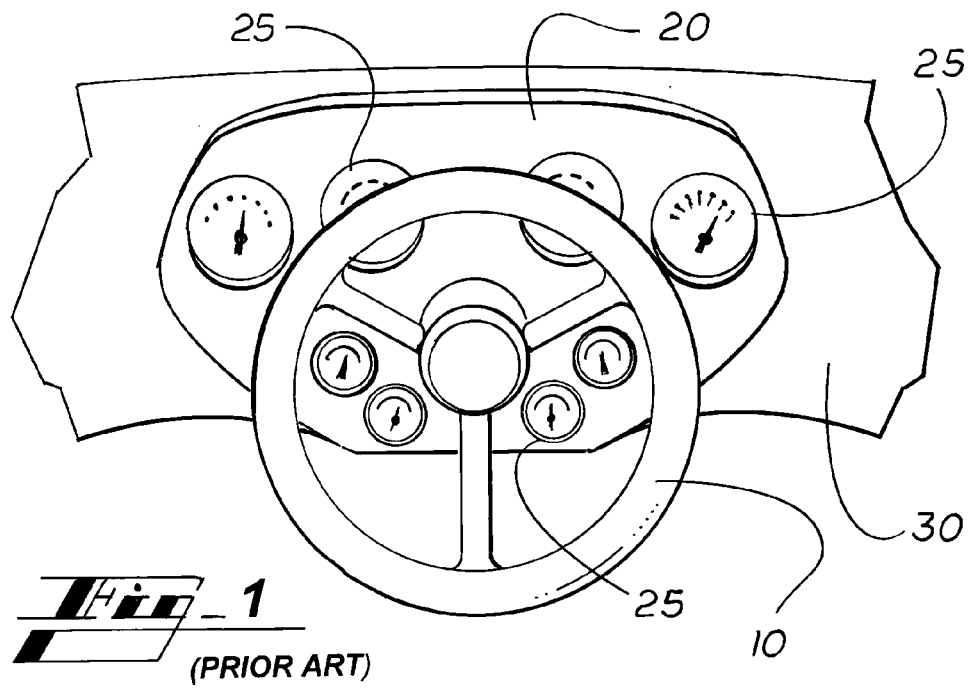
Fig_1 (PRIOR ART)
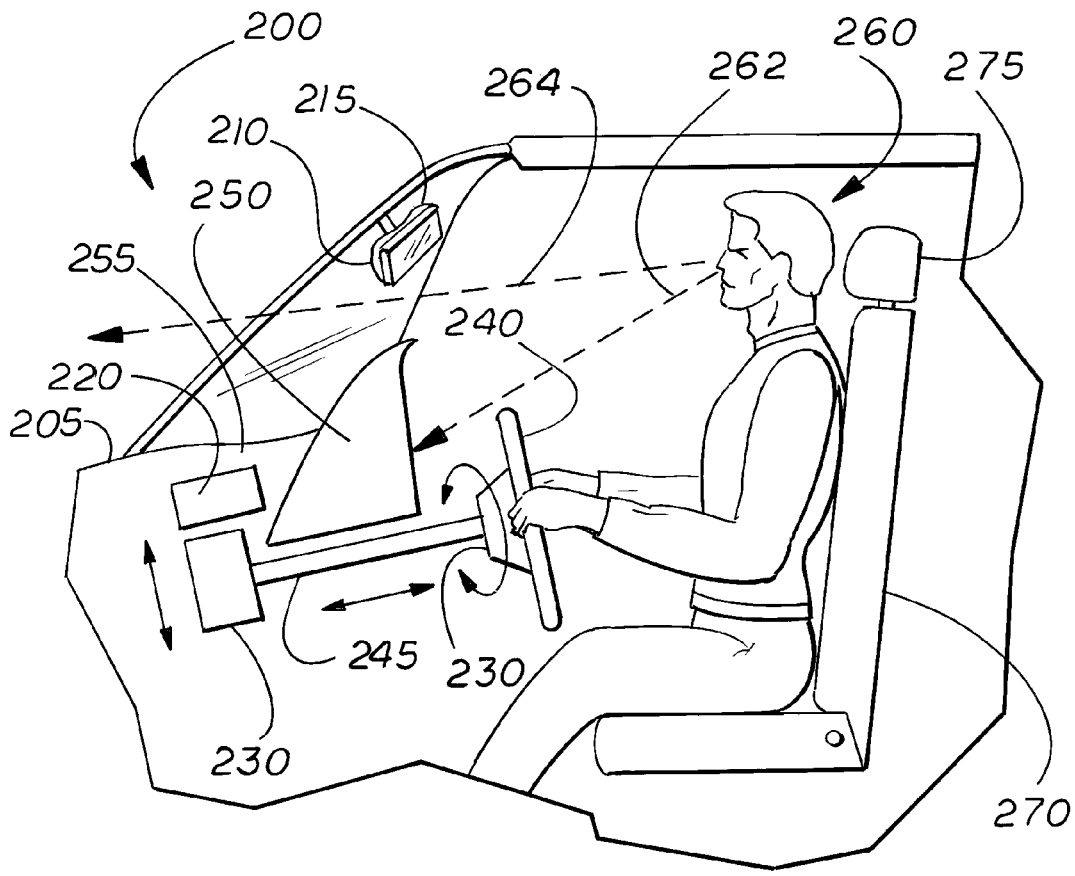
Fig_3

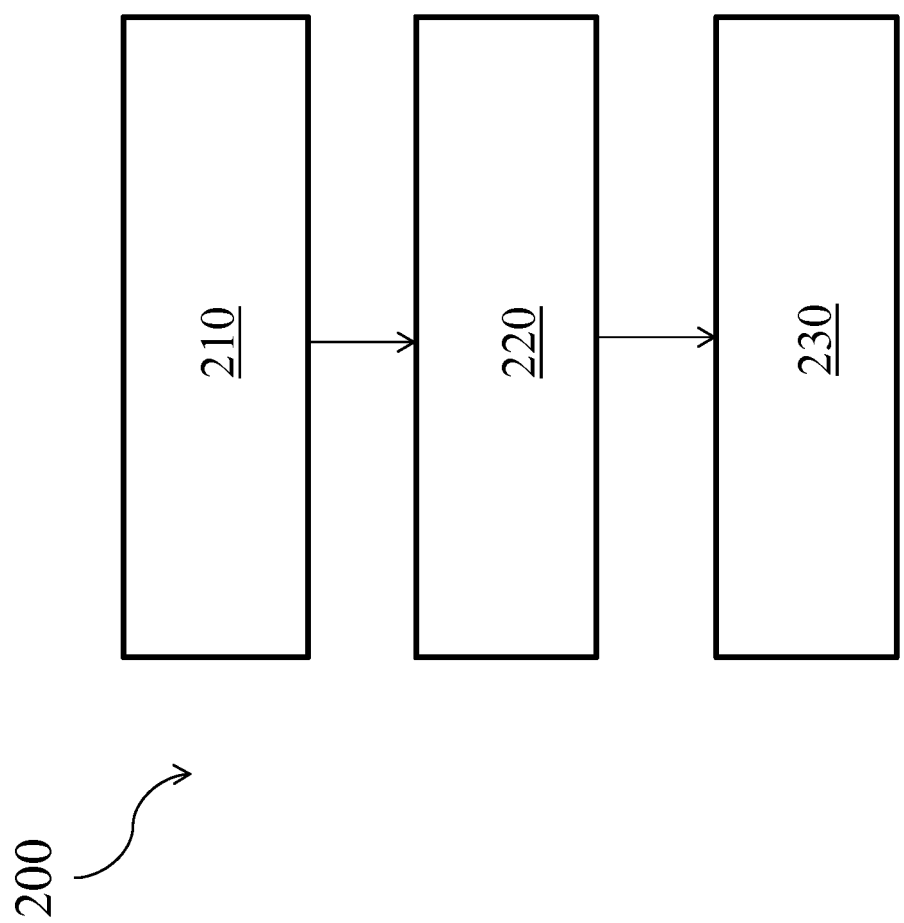

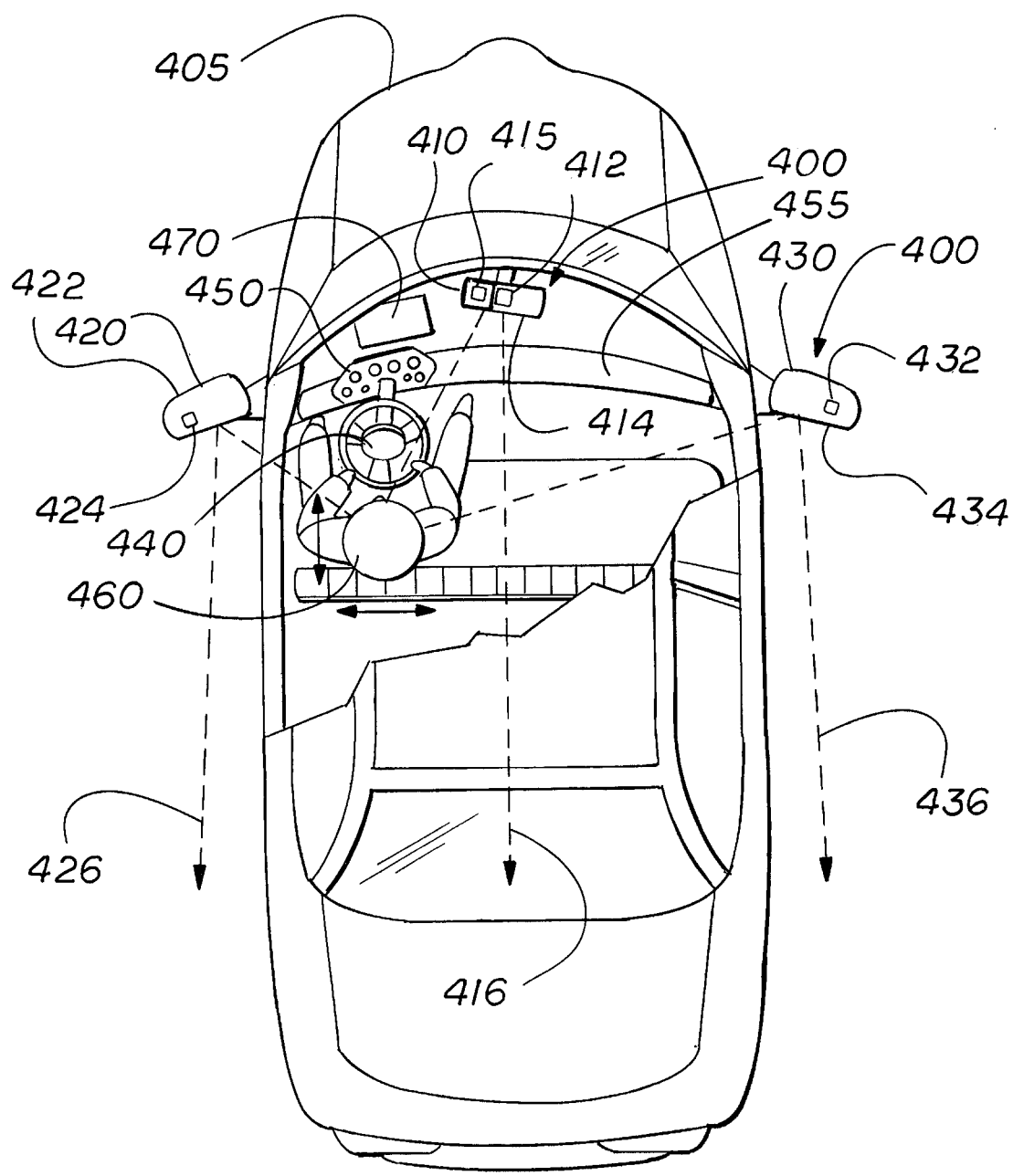
Fig_5

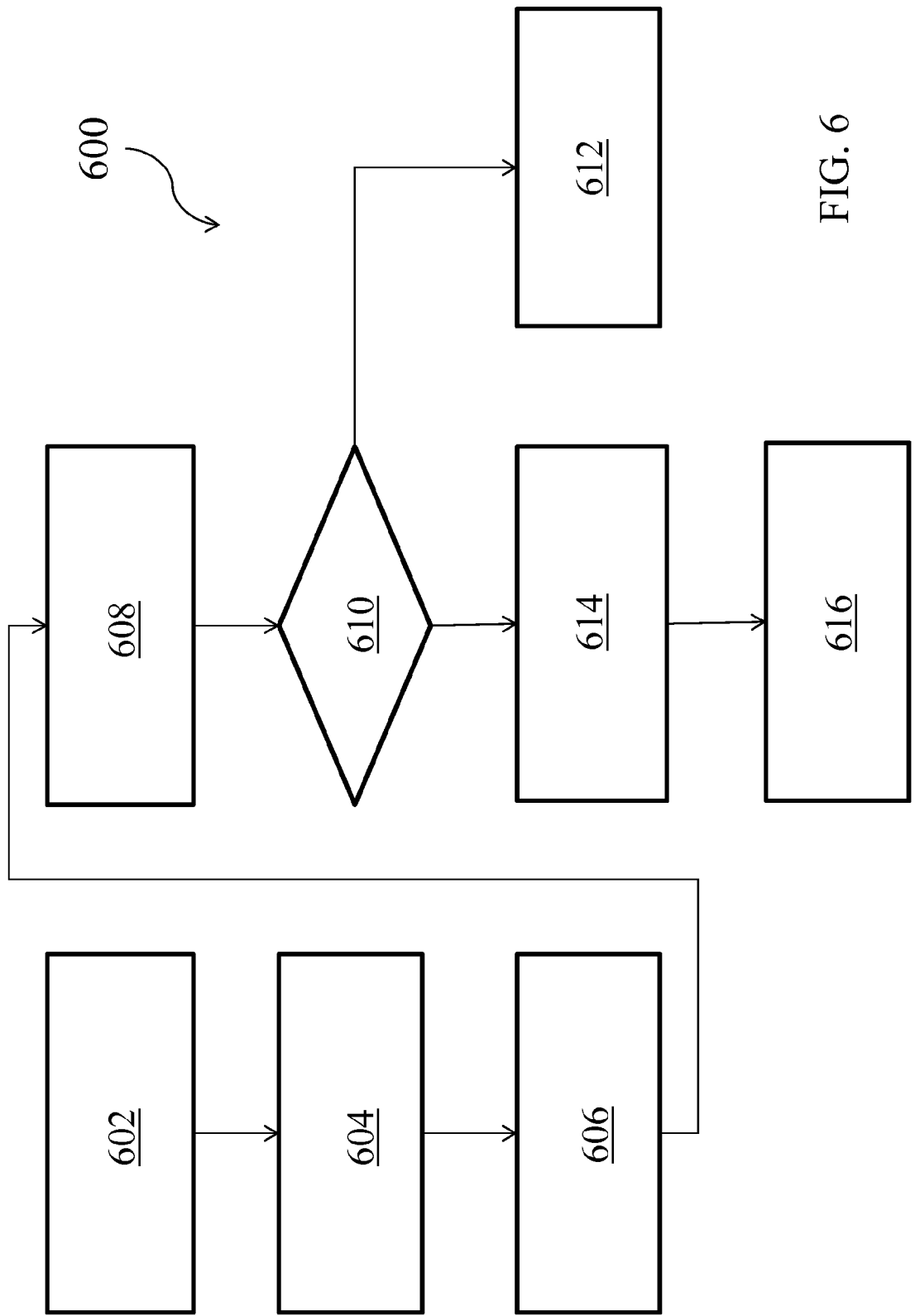

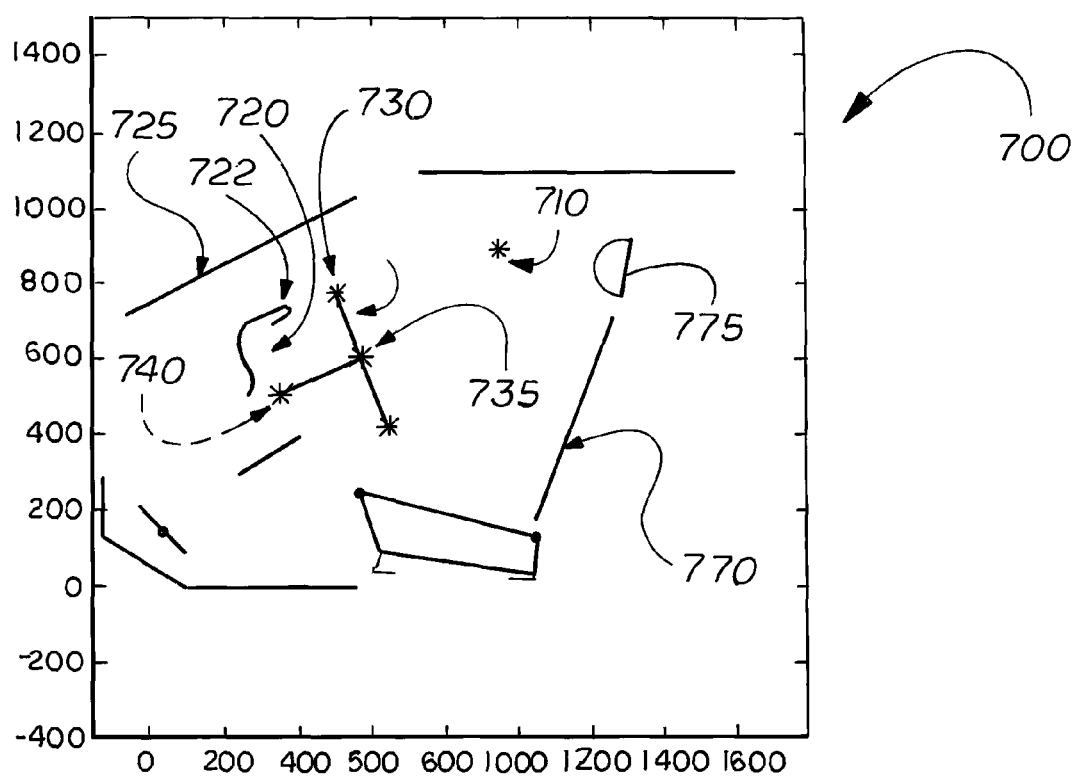
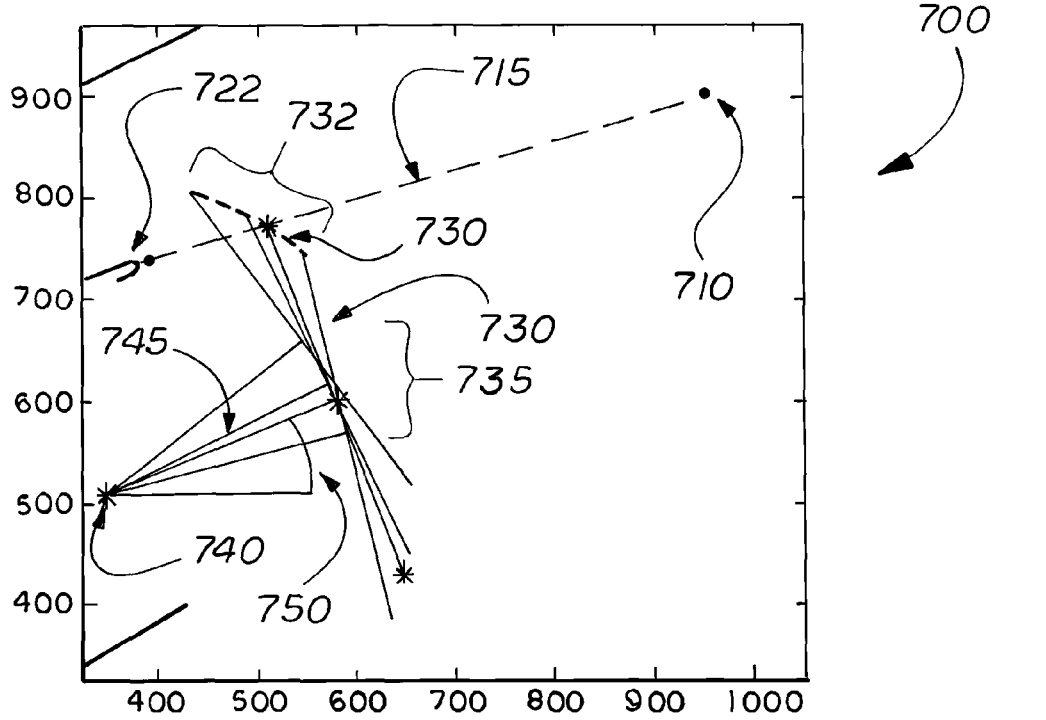

SYSTEM AND METHOD FOR AUTOMATICALLY ADJUSTING A STEERING TILT POSITION

I. FIELD OF THE INVENTION

The present disclosure relates to a system and method for adjusting an automobile steering wheel based on position of a head and/or eyes of the driver. More particularly, the present disclosure relates to a system and method that automatically adjusts the position of an automobile steering wheel to provide the driver an optimized view of the instrumentation panel and the road.

II. BACKGROUND OF THE INVENTION

Automobiles are typically equipped with a steering mechanism that allows a driver to control the path of travel of the automobile. Modern steering mechanisms most commonly include a steering wheel, a steering column, and a steering arrangement, e.g., a rack and pinion arrangement, in mechanical communication with at least the front automobile wheels. The steering wheel is typically connected to an end of the steering column such that it rests proximate the automobile driver so that the driver can conveniently and comfortable reach and turn the steering wheel while seated.

In use, as illustrated in FIG. 1, the steering wheel 10 commonly rests between the automobile driver (not shown) and an instrumentation panel 20 located on the automobile dashboard 30. The instrumentation panel 20 typically includes gauges, meters, and/or system controls 25 which inform the driver of the status of several functions related to the automobile. The instrumentation panel 20 is preferably located such that it can be clearly viewed by the driver while driving the automobile without requiring the driver to change his or her position or posture. However, because the steering wheel 10 typically rests between the driver and the instrumentation panel 20 the view of the instrumentation panel 20 is often obscured by the steering wheel 10. Further, the position of the steering wheel 10 should also preferably not obscure the view of the road, so the driver has a substantially clear, unobstructed view of the road.

It is well-known to provide automobiles with adjustable tilt steering wheels, adjustable steering columns, and telescoping steering columns to allow automobile drivers to move the steering wheel to a comfortable and convenient position. Adjustable tilt steering wheels allow the position of the steering wheel to be moved to one of multiple positions by pivoting about a horizontal axis at the end of the steering column. Adjustable steering columns allow the position of the steering column to be raised and lowered to change the vertical position of the steering wheel. Telescoping steering columns allow the length of the steering column to be adjusted to change the proximity of the steering wheel to the driver.

Further, it is well-known to provide automobiles with convenience settings that allow the driver to store a preferred position for the steering wheel to a vehicle memory. These settings allow the driver to automatically recall and adjust the position of the steering wheel such as, for example, upon a manual activation of the setting or upon startup of the automobile.

While the known systems are useful, there remains a need for a system and method that automatically adjust the position of the steering wheel, such as tilt position, based on the position of the head and/or eyes of the driver. There also remains a need for a system and method that provides enhanced safety by maximizing driver visibility of the instrumentation panel and the road. Therefore, it is desirable to provide a system and method for automatically adjusting the position and/or tilt of the steering wheel based on the position of the head and/or eyes of the driver.

III. SUMMARY OF THE INVENTION

In at least one embodiment, the present disclosure provides an automatically-adjusting steering wheel system comprising a steering wheel assembly; a head position sensor configured and arranged to detect a position of a head of a driver of a vehicle; and a master controller in communication with the head position sensor and the adjustable steering wheel assembly, wherein the master controller is configured to receive input from the steering wheel assembly; receive input from the head position sensor; and adjust the steering wheel assembly based on the input from the steering wheel assembly and the input from the head position sensor.

In at least another embodiment, the present disclosure provides a method, for adjusting the position of a steering wheel system automatically, comprising receiving input from a steering wheel assembly, wherein the input includes information indicating a position of a steering wheel of the steering wheel assembly; receiving input from a head position sensor, wherein the input indicates a position of a head of a driver; and adjusting the steering wheel assembly based on the input from the steering wheel assembly and the input from the head position sensor to provide the driver with unobstructed views of an instrumentation panel and the road.

In at least a further embodiment, the present disclosure provides a non-transitory computer-readable medium having stored thereon computer-executable instructions that, when executed by a processor, cause the processor to perform a method, comprising receiving input from a steering wheel assembly; receiving input from a head position sensor; and adjusting the steering wheel assembly based on the input from the steering wheel assembly and the input from the head position sensor to provide the driver with unobstructed views of an instrumentation panel and the road.

IV. BRIEF DESCRIPTION OF THE DRAWINGS

FIG. 1 illustrates a layout of a typical steering wheel and instrumentation panel arrangement.

FIG. 2 illustrates schematically an example of an automatically adjustable steering wheel system in accordance with an embodiment of the present disclosure.

FIG. 3 illustrates a side view example of an automatically adjustable steering wheel system, implemented in a vehicle with a driver, in accordance with an embodiment of the present disclosure.

FIG. 5 illustrates an overview of an arrangement for determining a driver head position suitable for use with a system in accordance with at least an embodiment of the disclosure.

FIG. 6 illustrates a method, for determining the steering wheel position adjustment, in accordance with an embodiment of the present disclosure.

FIG. 7A illustrates adjustable parameters of the steering wheel system, in a coordinate system, in accordance with an embodiment of the present disclosure.

FIG. 7B illustrates the parameters of FIG. 7A, as adjusted.

Figure 4:
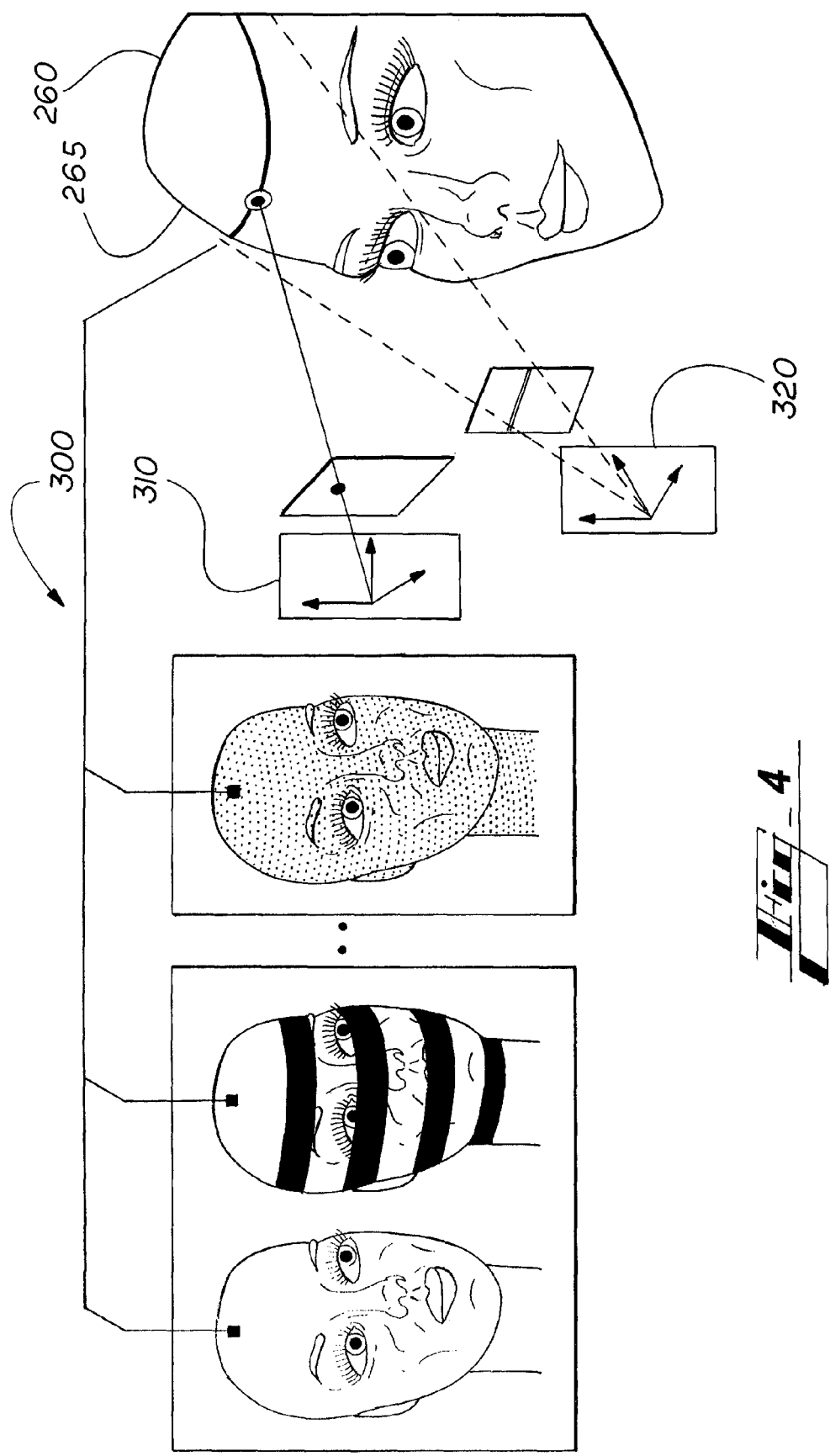
FIG. 4 illustrates an overview of a driver head position device suitable for use with an automatically adjustable steering wheel system in accordance with at least an embodiment of the present disclosure.

Given the following enabling description of the drawings, the inventive aspects of the disclosure should become evident to a person of ordinary skill in the art.

V. DETAILED DESCRIPTION OF THE DRAWINGS

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

In at least one embodiment, the present disclosure provides a system that, performing a method, automatically adjusts the position of various automobile components, such as the position and tilt of an automobile steering wheel, based on the position of the head and/or eyes of the driver of the automobile. The position of the head of the driver may change due to, for example, changes in the driver, changes in driver pose, changes in driver seat position, and the like.

The system enhances visibility by automatically adjusting the position and/or tilt of the steering wheel such that driver visibility of the instrumentation panel and the road are improved without requiring action such as, for example, manual input to the vehicle or bodily adjustment by the driver. The system minimizes the effects of improper user adjustment by automatically adjusting the position and/or tilt of the steering wheel based on the position of the head and/or eyes of the driver.

While embodiments of the present technology are described herein primarily in connection with automotive vehicles, the concepts are applicable equally to any type of vehicle having adjustable steering wheels. Other vehicle types include aircraft, marine craft, and motorcycles.

In at least one embodiment, the present disclosure provides automatic motorized adjustment of the position of the steering wheel of a vehicle, such as an automobile, in response to the position or changes in position of a driver, e.g., head position and/or eye position. In at least one embodiment, the system utilizes one or more driver monitoring device(s) to detect the head and/or eye position and then adjust the tilt of the steering wheel to provide the driver with optimal visibility of the instrumentation panel and/or the road. In at least one embodiment, the system adjusts the position of the steering wheel based on head and/or eye position and user preferences. In one or more embodiments, the system of the present disclosure obtains the driver head and/or eye position based on one or more methods including (i) receiving an input from a driver head and/or eye position sensor, (ii) determining an estimation of head and/or eye position based on a position or adjustment of a rear view mirror, or (iii) determining an estimation of head and/or eye position based on standing-height, sitting-height, and/or seat-position information for the driver. In some embodiments, the standing-height of a driver may be entered into the system such that the sitting-height of the driver may be estimated by the system based on an accepted relationship or correlation between standing-height-to-sitting-height. The standing-height-to-sitting-height relationship may be provided, for example, by a stored look-up table. The standing-height-to-sitting-height relationship may also similarly provide an estimation of the arm span of the driver. In some embodiments, the position of the steering wheel includes a vertical position (height) of the steering wheel, a telescoping position of the steering wheel, and/or a tilt position of the steering wheel.

FIGS. 2 and 3 illustrate schematically an automatically adjusting steering wheel system 200 in accordance with an embodiment of the present disclosure. The automatically adjustable steering wheel system 200 is configured and designed for use with an automobile 205. The steering wheel system 200 includes at least one driver head and/or eye position sensor 210, a master controller 220, and an adjustment assembly 230. While the sensor 210 is shown as a single sensor mounted on the central rear view mirror 215, this arrangement is provided only as an example. Various other sensor arrangements and mounting locations are contemplated as will be discussed below. While a connection is not shown explicitly in FIG. 3, each of the sensor(s) 210 and adjustment assembly 230 are in communication with the master controller 220.

The master controller 220, such as a vehicle control unit, includes a processor (not shown) and a memory mechanism (not shown). The memory mechanism includes a non-transitory computer-readable medium that stores computer-executable instructions that, when executed by the processor, cause the processor to initiate adjustment of the position of the steering wheel 240 in accordance with the disclosure herein. The memory may also store other information including, for example, pre-selected vehicle settings, such as steering wheel position setting (e.g., pre-set tilt position) the steering wheel position including tilt, and other pre-selected settings.

The steering wheel system 200 automatically adjusts the position of the steering wheel 240 to provide the driver 260, seated in automobile seat 270, with an unobstructed view of the instrumentation panel 250 (of dashboard 255) and the road (not shown) via lines of sight 262, 264, respectively, based on head and/or eye position of the driver 260. The master controller 220 receives an input from driver head and/or eye position sensor 210. Based on the input received, the master controller 220 provides an output to an adjustment assembly 230 to adjust the position of the steering wheel 240. As provided, adjustable parameters include tilt of the steering wheel 240, height of the steering wheel, and proximity of the steering wheel to the driver. Height and proximity can be changed by adjusting the steering column 245. The adjustment assembly 230 is arranged and configured to adjust the position of the steering wheel 240 with respect to the steering column 245. The adjustment assembly 230 may also be arranged and configured to adjust the position of the steering column 245 with respect to the automobile 205. The adjustment assembly 230 may include various adjustment mechanisms such as a tilt mechanism, a height mechanism and a proximity mechanism. Tilt of the steering wheel 240 can be changed by adjusting the tilt mechanism (not shown in detail) of the adjustment assembly 230 connecting the steering wheel 240 to the steering column 245. In contemplated embodiments, height of the steering wheel 240 can be changed via a height mechanism (not shown in detail) of the adjustment assembly 230 connecting the steering wheel 240 and steering column 245 and/or proximity of the steering wheel 240 to driver 260 can be changed via a proximity mechanism (not shown in detail) of the adjustment assembly 230 connecting the steering wheel 240 and steering column 245.

While the adjustment assembly 230 is shown as two separate units that adjust the position of the steering wheel 240 directly and/or indirectly via adjusting the steering column 245, the adjustment assembly 230 may be configured in other ways, such as by including a single adjustment assembly that adjusts the steering wheel 240 directly and/or indirectly via the steering column 245. In contemplated embodiments, the adjustment mechanism 230 includes one module that adjusts the tilt, height and/or proximity of the steering wheel 240 and/or steering column 245. In other contemplated embodiments, the adjustment mechanism 230 includes two or more modules that separately adjust the tilt, height and/or proximity of the steering wheel 240 and/or steering column 245.

For embodiments in which proximate position of the steering wheel 240 is changed via adjustment to the steering column 245, the adjustment assembly 230 adjusts a length of the steering column 245 along a longitudinal axis thereof to position the steering wheel 240 closer to or farther away from the driver 260. The adjustment assembly 230 may also adjust the height of the steering column 245 by, for example, pivoting the steering column 245 about an end opposite the steering column 245 to effectively raise or lower the position of the steering wheel 240. The adjustment assembly 230 also adjusts the tilt angle of the steering wheel 240 by, for example, pivoting the steering wheel 240 about an end of the steering column 245. The position of the steering wheel and/or steering column may be adjusted to position the steering wheel 240 to, for example, a more comfortable and/or ergonomic proper position to avoid fatigue for the driver 260, while providing optimal or unobstructed lines of sight 262 and 264 with the instrumentation panel 250 and road, respectively.

In at least some embodiments, the steering wheel system 200 monitors a plurality of variables that may affect the position of the head of driver 260 and thereby the lines of sight 262, 264 of the driver 260. The variables affecting the lines of sight 262, 264 may include, for example, changes in driver 260 (change of driver A to driver B), changes in the posture of driver 260, adjustment of the position of seat 270 or headrest 275 thereof, changes in other driver setting(s), etc. In at least some embodiments, the steering wheel system 200 considers one or more of the plurality of variables to determine if and to what extent the position of the steering wheel 240 and/or steering column 245 should be adjusted in order to maintain the optimal lines of sight 262, 264, as discussed more thoroughly below. In at least some embodiments, the steering wheel system 200 monitors the plurality of variables to determine if and to what extent the steering wheel 240 and steering column 245 should be adjusted and automatically makes the adjustments necessary to maintain optimal lines of sight 262, 264.

The master controller 220 is arranged to be in communication with and receives input from head and/or eye position sensor(s) 210 and adjustment assemblies 230. Channels of communication are not shown expressly, but can be wired and/or wireless. The adjustment assemblies 230 include a motor (considered to be shown schematically though not shown in detail) and an adjustment, or activation, mechanism (also considered to be shown schematically though not shown in detail) that receive an input from the master controller 220. The activation mechanism and motor adjust the position of the steering wheel 240 and/or steering column 245 based on the input received from the master controller 220. The activation mechanism may include a microprocessor, solenoid, and/or other similar components arranged and configured to adjust the position of the steering wheel 240 and steering column 245, as discussed throughout the disclosure.

The driver head position sensor 210 may be selectively programmed to determine the head and/or eye position of the driver in a variety of manners. The head and/or eye position of the driver 260 may be detected to determine an initial steering wheel position based upon the occurrence of an event or driver input. The occurrence of an event may include, for example, the driver entering the automobile 205, starting the automobile 205, adjusting the seat 270 and/or headrest 275, or adjusting the central rear view mirror 215 or side view mirrors, and the like. Driver input may include, for example, activation of driver preferences, activating a key fob, resetting the system, etc. Upon detecting the position of the head of the driver 260, the head position sensor 210 provides an input to master controller 220.

The master controller 220 determines an appropriate adjustment for the steering wheel 240 based on the head and/or eye position of the driver, alone, or in combination with an initial steering wheel position. The initial steering wheel position may be based upon, for example, driver preferences, factory standards, driving information such as standing height, and seat position, etc. and indicate a proper or preferred steering wheel position for the driver prior to a change in the head and/or eye position of the driver. Upon a change in the head and/or eye position of the driver being detected, the master controller 220 automatically adjusts the position of the steering wheel 240 to the determined appropriate position such that optimal or desired lines of sight 262 and 264 are maintained. The steering wheel position may be automatically adjusted by the system 200, for example, upon startup (prior to engaging the drive system of the automobile 205) or upon driver request, to reposition the steering wheel 240, as appropriate.

In one embodiment, the steering wheel system 200 deactivates under certain circumstances, e.g., upon engagement of the drive system of automobile 205, upon removing the transmission of automobile 205 from "Park", etc. The steering wheel system 200 is reactivated upon the reason for deactivation being removed, e.g., upon the drive system being disengaged, the transmission being returned to the "Park" position, etc.

In at least one embodiment, the driver head and/or eye position sensor 210 is located on the central rear view mirror 215. Reference to the sensor 210 being located on the rear view mirror 215 is not made in a limiting sense as the sensor 210 could be associated with the rear view mirror 215 in any of a variety of ways, such as by being mounted on an exterior surface of the mirror 215 and/or being positioned at least partially within the mirror 215. In other embodiments the driver head position sensor 210 is located at other suitable location(s) within the passenger compartment that allow the sensor 210 to sense the head and/or one or both eyes of the driver without obstruction, e.g., on the windshield, dashboard, headliner, or the like.

In some embodiments, the position of steering wheel 240 and/or steering column 245 can be manually adjusted by the driver 260 using at least one steering wheel position switch or lever (not shown). In at least some embodiments, the steering wheel system 200 is configured to be controlled, set, or adjusted by the user in various ways including those described herein. In one embodiment, the system 200 can be turned on and off by the user. Turning the system on and off allows the automatic adjustment of the steering wheel 240 to be enabled and disabled by the user.

In at least one embodiment, the system 200 provides multiple line of sight settings including, for example, driver-preferred (pre-selected by driver 260) and system-suggested (determined by system 200). The line of sight selections may be stored in and retrieved from the master controller 240. Storing the driver-preferred line of sight and preferred steering wheel settings allows the driver to pre-select preferred lines of sight for the instrumentation panel and/or road, and allows for quick retrieval of pre-selected information thereby improving user efficiency and enhancing system visibility.

In at least one embodiment, the system 200 is configured to receive the pre-selection via a user-vehicle interface (not shown in detail) such as a touch-sensitive display or other manual control. The system 200 then maintains the preferred line of sight pre-selected by the driver even as the position of the head of the driver changes.

The system-suggested line of sight and steering wheel settings allow the system to determine and suggest a line of sight (e.g., what the system determines might be an ideal line of sight fostering optimal (unobstructed) views of the instrumentation panel and road. In at least some embodiments, the ideal line of sight might vary in accordance to driving conditions, e.g., speed, urban/freeway, weather, time of day, car load, position or direction, etc. The system 200 may determine the ideal lines of sight using these parameters and maintain those lines of sight based on the head position of the driver. In at least some embodiments, the system 200 adopts the suggest lines of sight upon receiving an input from the driver indicating acceptance of the suggested line of sight. In one or more contemplated embodiments, the system 200 adopts the lines of sight, following determining them, without suggesting them to the driver and/or receiving and accepting them as input from the driver. Once the system 200 adopts the suggested lines of sight, the system 200 then maintains the system-suggested line of sight setting even as the position of the head of the driver changes.

FIG. 4 illustrates examples of driver head position sensors suitable for use with a system in accordance with at least one embodiment of the present disclosure, such as the embodiment illustrated in and described in connection with FIGS. 2 and 3. The driver head position sensor 300 may employ and receive input from various technologies including a camera 310, radar, and/or projector 320. The head position sensor 300 uses input from the camera 310, radar, and/or projector 320 to that determine the position of the head of a driver 260 such that the line of sight of the driver can be determined. In some embodiments, determining the position of the head of the driver includes determining, particularly, a position of a center 265 of the head of the driver 260 or the position of one or both of the eyes of the driver 260.

The driver head position sensor 300 may use three-dimensional (3D) imaging and the like. Exemplary technologies for the driver head position sensor 300 and eye position sensor include various models of the SMARTEYE® automatic recognition systems, e.g., sensor model SP1052/01, manufactured by SmartEye Corporation of Rochester Hills, Mich., and various models of the PrimeSense natural interaction systems manufactured by PrimeSense Ltd. of Tel-Aviv, Israel.

Subsystems and associated methods performed by them to determine head position can be referred to as input subsystems and methods, or just input systems, because they provide active input to the overall system 200 (e.g., to the master controller 220) for use in determining a position for and/or any needed changes in position for the steering wheel 240. Input systems and methods for determining the head and/or eye position of the driver, other than three-dimensional imaging, include, for example, (I) two internal cameras mounted at an offset with respect to each other to estimate the three-dimensional (3D) position of the head of the driver; (II) structured light sensor(s); (III) a single camera that employs advanced facial pose estimation algorithms and driver specific eye distance calibration; (IV) a mirror (central and/or side) that incorporates an internally mounted camera that needs only to detect the line of sight of the driver; and (V) two (or more) separate modules of the same sensor that allow for triangulation to determine the position of the head of the driver. In at least some embodiments, the eye position of the driver is estimated based on the size and/or position of the head of the driver.

In at least some embodiments, other input systems and methods may be used, or alternatively, along with one or more other input systems or methods to determine the head position of the driver. These other input systems and methods include, for example, estimation based on the adjustment and/or position of the rear view mirrors; and an estimation based on the known standing-height, known sitting-height, and seat position of the driver. As discussed above, the standing-height-to-sitting-height relationship may be stored in a memory of the vehicle, e.g., by a look-up table. The standing-height-to-sitting-height relationship may also provide an estimation of the arm span of the driver. In some embodiments, the position of the steering wheel includes a vertical position (height) of the steering wheel, a telescoping position of the steering wheel, and/or a tilt position of the steering wheel.

A rear view mirror system 400 suitable for use with the present disclosure is illustrated in FIG. 5. The rear view mirror system (or subsystem) 400 for use with the automobile 405 includes a master controller 470 in communication with mirror assemblies 410, 420, 430. The master controller 470 can be the same as the master controller 220 described above. The master controller 470 receives an input from driver head and/or eye position sensor 415.

Each of the mirror assemblies 410, 420, 430 includes a motor 412, 422, 432 and a reflective element 414, 424, 434 such as a mirror. The motors 412, 422, 432 are used by the master controller 470 or other controller to adjust the angle of, and thereby the lines of sight 416, 426, 436 provided to the driver 460 by, the reflective elements 414, 424, 434, respectively. The angle of the reflective elements 414, 424, 434 and thereby the lines of sight 416, 426, 436 are stored in master controller 470. Estimation of the head position of the driver 460 may then be determined by receiving the preferred lines of sight for the rear view mirrors 410, 420, 430, the instrumentation panel 450 of the dashboard 455, the road (not shown), and the position of the steering wheel 440. These setting may then be stored as the initial settings. Once the initial settings are established, the adjustment of any of these variables, e.g., a rear view mirror 410, 420, 430, may be used by the master controller 470, with or without input indicating driver head position expressly (e.g., camera data), to determine an appropriate adjustment to maintain the lines of sight of the instrumentation panel 450 and road.

Similarly, estimations based on known standing heights, sitting heights, and seat position may be used. For example, initial settings may include, for example, the driver height, sitting height, seat position, and the established lines of sight based on the automobile mirror angles and steering wheel position. Once established, adjustment of any of these variables may be detected by the master controller to determine an appropriate adjustment for the steering wheel in order to maintain the lines of sight by using the initial setting variables.

FIG. 6 illustrates a method for determining the steering wheel position adjustment in accordance with an embodiment of the present disclosure. It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims.

It should also be understood that the illustrated method 600 can be ended at any time. In certain embodiments, some or all steps of this process, and/or substantially equivalent steps are performed by a system, such as the systems described herein, or more particularly by a processor, such as a processor described herein (e.g., a processor of the master controller 220, 470 described herein), executing computer-readable instructions stored or included on a non-transitory computer-readable storage medium.

At block 602, the system is activated. At block 604, the system receives input for the initial settings for the automobile components, as described above, including, e.g., the position of the steering column and/or steering wheel. At block 606, the system receives a driver input to adjust one or more of the initial setting(s). At 608, the system detects the position of the head of driver and calculates an appropriate adjustment of the position of the steering column and steering wheel in order to maintain the optimal line of sight of the instrumentation panel and road for the driver. At decision diamond 610, the system determines whether the automobile is in "Park." If "No", at block 612 the system does not adjust the position of the steering wheel or steering column. If "Yes", at block 614 the system adjusts the position of the steering column and steering wheel based on the calculated adjustment. At block 616, the system stores the adjusted settings for the driver and calculates a "bias" or "preference" for the driver based on the adjusted settings. The bias may be considered the next time the associated driver adjusts his/her position or the system settings. Following block 612 and block 616, the system ends the process and awaits re-activation of the system.

FIGS. 7A and 7B illustrate adjustable parameters of the steering wheel system of an automobile in accordance with the present disclosure. FIGS. 7A and 7B depicts the layout parameters, in a two-dimensional (2-D) coordinate system 700 (having X and Y axes listed in millimeters), including the position of various system components in accordance with at least one embodiment of the present disclosure. The present technology uses one or more algorithms to compute optimal lines of sight of the instrumentation panel and road based on the position of the head of the driver. The present technology (e.g., system 200) then adjusts the position of the steering wheel to provide the driver unobstructed views of the instrumentation panel and road by adjusting the position of the steering wheel based on known parameters of steering wheel (while taking into account driver preferences). The system of the present disclosure identifies the position of the head or eye point 710 of a driver (seated in seat 770 having headrest 775) with respect to the instrumentation panel 720. An optimal line of sight 715 of the instrumentation panel 720 and road (via windshield 725 for the driver is determined based on the determined eye point 710 of driver. The system then adjusts the position of the steering wheel 730 such that at least one part, e.g., a rim, of the steering wheel 730 does not obstruct the optimal line of sight 715. In order to adjust the position of the steering wheel 730, the steering column 745 may be adjusted up or down in a vertical direction on a pivot point 740 by a determined angle 750, or the steering wheel 730 may be tilted along a center 735 such that the part(s), e.g., rim, of steering wheel does not interfere with the optimal lines of sight of the instrumentation panel 720 and road via windshield 725.

The master controller 220 and/or 470 of the system of the present disclosure utilizes the above-described component parameters (e.g., the driver eye point, the top point of the instrumentation panel, the top point of the steering wheel, etc. to automatically adjust the position of the steering wheel of an automobile in order to provide optimal lines of sight of the instrumentation panel and road for a driver. The master controller 220 and/or 470 uses equations to calculate the optimal lines of sight based on the layout of the automobile components and the position of the head of the driver. The system utilizes known parameters for the steering wheel and instrumentation panel, and determined parameters for the steering wheel, head or eye point, and/or preferred settings to determine the optimal lines of sight; and adjusts the position and/or tilt of the steering column and steering wheel based on the determined appropriate position in order to maintain the optimal lines of sight.

The following example equations and calculations may be used to determine the optimal lines of sight of the instrumentation panel and road for the driver based on a determined position of the head of the driver. The exemplary parameters include parameters for the vehicle and parameters for the driver. The vehicle parameters are typically known based on the vehicle components. The driver parameters are typically unknown and must be determined in accordance with the disclosure herein. The vehicle parameters include various parameters related to the steering wheel and the instrumentation panel. The steering wheel parameters include the following: steering wheel diameter SWdiameter, steering wheel pivot to center length SWPC, steering wheel minimum tilt angle SWAmin, steering wheel maximum tilt angle SWAmax, steering wheel pivot x-coordinate SWPivx, and steering wheel pivot y-coordinate SWPivy. The instrumentation panel parameters include instrumentation panel x-coordinate IPx and instrumentation panel y-coordinate IPy. The driver parameters include the eye point of the driver in the x and y coordinates. The eye point of the driver includes eye point x-coordinate Eyex and eye point y-coordinate Eyey.

The example equations and calculations used herein will be discussed with respect to FIGS. 7A and 7B. The lines of sight are based on the eye point 710 of a driver (not shown) seated in seat 770 having headrest 775. The eye point 710 determines the lines of sight of the driver for the instrumentation panel 720, the steering wheel 730, and the road via the windshield 725. As discussed above, the lines of sight of the driver may be obstructed by the top point(s) 732 of the steering wheel 730 and the top point 722 of the instrumentation panel 720 (also called the instrumentation panel (IP) point). Therefore, the steering wheel center 735 and steering wheel pivot 740 allow the position of the steering wheel 730 and steering column 745 to be changed to a more appropriate position, as discussed herein.

In order to make the calculations discussed herein, the system finds the interception point between the following two lines: (1) the straight line 715 formed between the eye point 710 and the top point 722 of the instrumentation panel 720, and (2) the line formed by the trajectory of the various adjustable top point(s) 732 of the steering wheel 730. When determining the intersection point, it is noted that line 715 is a straight line and the various adjustable top point(s) 732 of the steering wheel 730 constitute circles. The intersection point between a circle and a straight line is calculated based on geometry, as discussed below.

Figure 7C:
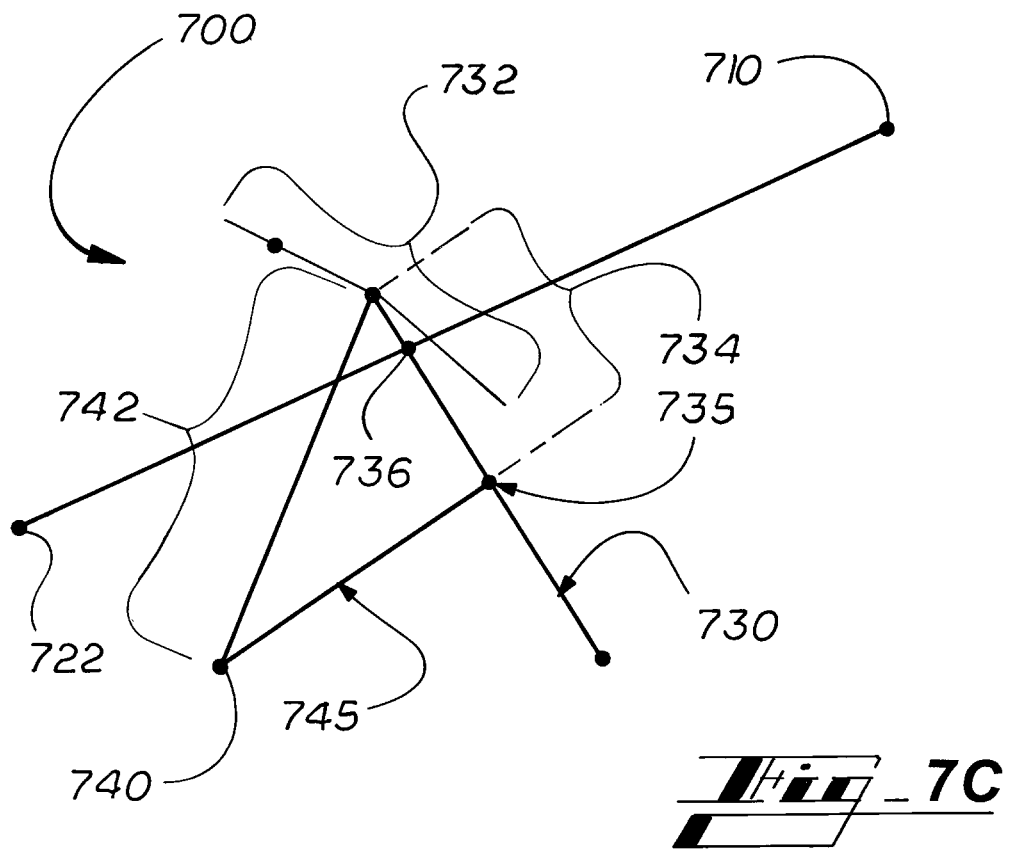
FIGS. 7C and 7D illustrate the geometric relationship of the parameters of the steering wheel system of FIGS. 7A and 7B.
Figure 7D:
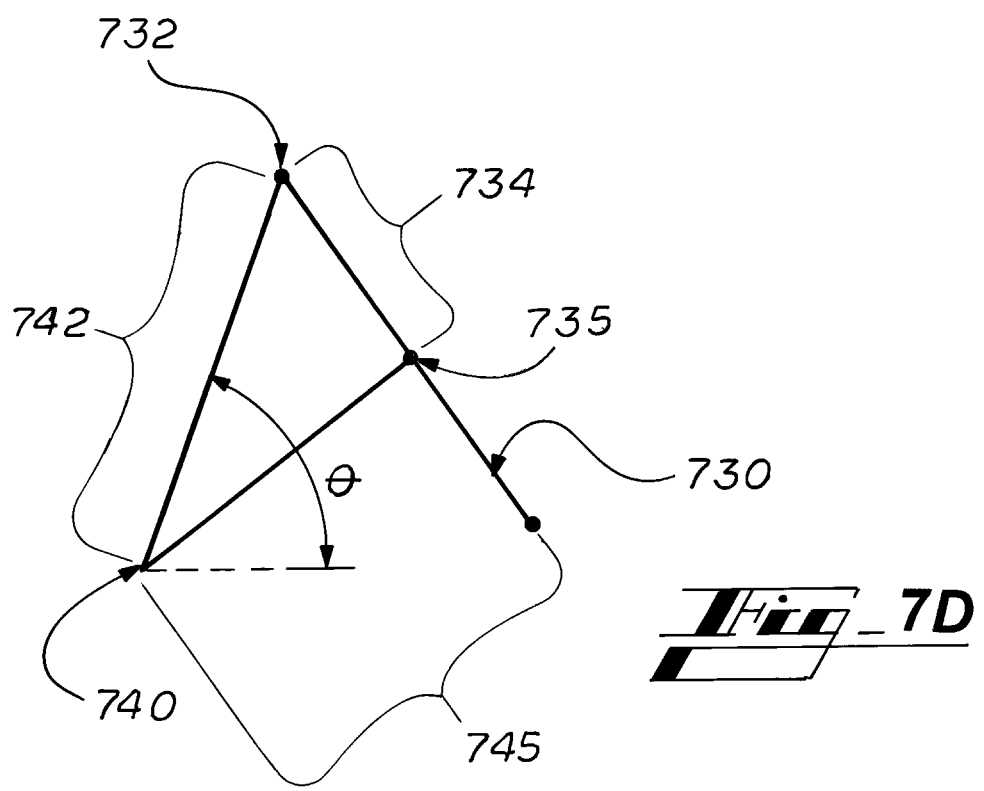

FIGS. 7C and 7D illustrate the geometric relationship of the parameters of the steering wheel system 700 of FIGS. 7A and 7B. The geometry of steering wheel 730 and steering column 745, as shown in FIGS. 7C and 7D, includes the steering wheel pivot SWPiv 740, the steering wheel center 735, the top point(s) 732 of steering wheel 730, steering column 745 or the steering wheel pivot to center length SWPC, the steering wheel radius 734 (given by the steering wheel diameter divided by 2 or SWdiameter/2), and delta 742 given by the distance from the steering wheel pivot SWPiv to the top point 732 of steering wheel 730. The geometry of steering wheel 730 and steering column 745 yields the following equation:

$$\text{delta} = \sqrt{(SWPC)^2 + (SWdiameter/2)^2}$$

The steering wheel pivot to center length SWPC or length of steering column 745, the steering wheel radius 734, and the length from the steering wheel pivot SWPiv to the top point 732 of the steering wheel 730 creates a triangle that allows the length of the sides of the triangle to be determined. For example, the tilt, length, and/or change of length (for telescoping steering columns) of the steering wheel pivot to center SWPC can be determined based on the known lengths of the other sides of the triangle. The top point 732 of the steering wheel 730 has a circular trajectory centered at the steering wheel pivot 740. The steering wheel pivot 740 coordinates are denoted as (SWPiv_x, SWPiv_y). The (x, y) points that fall on a circle with pivot center (SWPiv_x, SWPiv_y) and a radio equal to delta is given by:

$$(x - SWPiv_x)^2 + (y - SWPiv_y)^2 = \text{delta}^2 \quad (1)$$

Given eye-point 710 coordinates (Eye_x, Eye_y) and instrumentation panel point 722 coordinates (IP_x, IP_y), the slope of the connecting straight line can be computed as:

$$m = \frac{Eye_Y - IP_Y}{Eye_X - IP_X}$$

The points (x, y) on the straight line satisfy the following equation:

$$m = \frac{y + SWPiv_Y - IP_Y}{x + SWPiv_X - IP_X} \quad (2)$$

The intersection point (INTER) 736 must satisfy Equations 1 and 2. The following is the calculation of the coordinates INTER_x and INTER_y. Both sides of Equation 2 are multiplied by the following:

$$x + SWPiv_X - IP_X$$

The terms are distributed to yield the following:

$$mx - y = SWPiv_Y - IP_Y - mSWPiv_X + mIP_X$$

The term on the right is then defined as:

$$\text{kappa} = SWPiv_Y - IP_Y - mSWPiv_X + mIP_X$$

This yields the following equation:

$$mx - y = \text{kappa} \quad (3)$$

Equation 3 is rewritten as follows:

$$mx = y + \text{kappa}$$

Squaring both sides yields the following equation:

$$m^2 x^2 = y^2 + 2y\text{kappa} + \text{kappa}^2 \quad (4)$$

A coordinate translation is then defined by the following:

$$x \mapsto x + SWPiv_x$$

$$y \mapsto y + SWPiv_y$$

Equation 1 then becomes the following equation:

$$x^2 + y^2 = \text{delta}^2$$

And then the following equation:

$$x^2 = \text{delta}^2 - y^2 \quad (5)$$

Substituting Equation 5 in Equation 4 yields the following:

$$m^2(\text{delta}^2 - y^2) = y^2 + 2y\text{kappa} + \text{kappa}^2$$

And then the following quadratic equation:

$$(m^2 + 1)y^2 + 2y\text{kappa} + \text{kappa}^2 - m^2\text{kappa}^2 = 0$$

Solving the quadratic equation, keeping the positive root (top point of the steering wheel on the positive side of the circle), yields the following equation:

$$y = \frac{-\text{kappa} + m\sqrt{\text{delta}^2(m^2 + 1) - \text{kappa}^2}}{m^2 + 1} \quad (6)$$

The intersection point INTER may then be defined by the following:

$$INTER_d = \frac{-\text{kappa} + m\sqrt{\text{delta}^2(m^2 + 1) - \text{kappa}^2}}{m^2 + 1}$$

The coordinate transform from Equation 6 may then be undone to yield the following:

$$y - SWPiv_y = INTER_d$$

The following relationship is noted:

$$y = INTER_y$$

This relationship yields the following:

$$INTER_Y = SWPiv_Y + INTER_d$$

Equation 5 yields the following:

$$x = \sqrt{\text{delta}^2 - y^2}$$

The coordinate transformations are undone and the x and y intersection points are substituted as follows:

$$y = INTER_y \text{ and}$$

$$x = INTER_x$$

Substituting these values allows the intersection point to be determined as follows:

$$INTER_X = SWPiv_X + \sqrt{\text{delta}^2 - INTER_d^2}$$

The above-listed equation allows the proper intersection point of the steering wheel to be determined such that the position of the steering wheel can be automatically adjusted to provide the driver unobstructed obstructed views of the instrumentation panel and road, consistent with the disclosure herein.

The steering wheel tilt angle is discussed with respect to FIGS. 7C and 7D. An angle theta θ or A18 is formed between a first line created by the steering wheel to pivot center SWPC or steering column 745 and a second line created by the steering wheel pivot SWPiv and top point 732 of the steering wheel 730. It is noted that the angle theta θ or A18 is provided by the following equation:

$$A18 = \theta - (180/\pi)\arctan((SWdiameter/2)/SWPC) \quad (7)$$

The points (x, y) that fall on a circle in polar coordinates would be given by the following equations:

$$x = SWPiv_x + \delta\cos\theta \quad (8)$$

$$y = SWPiv_y + \delta\sin\theta \quad (9)$$

The previously defined coordinate translation is applied. The coordinate translation is given by the following:

$$x \mapsto x + SWPiv_x$$

$$y \mapsto y + SWPiv_y$$

Applying these relationships, Equation 9 becomes the following:

$$y = \delta\sin\theta$$

In the transformation domain Equation 9 must be equal to Equation 6. This relationship provides the following:

$$\delta\sin\theta = INTER_d$$

Solving for theta θ and substituting in Equation 7 yields the tilt angle (A18) of the steering wheel as follows:

$$A_{18} = \left(\frac{180}{\pi}\right)\arcsin\left(\frac{INTER_d}{\delta}\right) - \left(\frac{180}{\pi}\right)\arctan\left(\frac{SWdiameter/2}{SWPC}\right)$$

The above-listed equation allows the proper tilt angle (A18) of the steering wheel to be determined such that the position of the steering wheel can be automatically adjusted to provide the driver unobstructed views of the instrumentation panel and road, consistent with the disclosure herein.

The following parameters and calculations illustrate an example of how the steering wheel position adjustment of the present disclosure is determined. The relevant vehicle parameters (all listed in millimeters (mm)) are as follows:

Instrumentation Panel x-coordinate IPx=382.938
Instrumentation Panel y-coordinate IPy=736.85
Steering Wheel Diameter SWdiameter=372.3
Steering Wheel Angle (min) SWAmin=13.518
Steering Wheel Angle (max) SWAmax=37.989
Steering Wheel Pivot to Center SWPC=243.0315

The relevant driver parameters (all listed in millimeters (mm)) are provided below in TABLE 1.

| Personal INPUT Eye Point x (mm) | SW Pivot INPUT Eye Point y (mm) | OUTPUT SW Piv Point x (mm) | SW Piv Point y (mm) | Theta θ (A18) (degrees) |
|---|---|---|---|---|
| 952 | 900 | 353 | 509 | 22.01 |
| 951 | 854 | 347 | 507 | 19.34 |

The system and method of the present disclosure utilizes the determined parameters to compute the proper position for the steering wheel including steering wheel height and tilt in both fixed length and telescoping steering columns, for a vehicle driven by a driver based on the relevant vehicle parameters and driver parameter, as disclosed herein. The presented computation determines the steering wheel tilt angle for vehicles having fixed length and/or telescoping steering columns.

The MATLAB algorithm listed below provides an example of the computations based on the relevant vehicle parameters and driver parameters listed above in TABLE 1. The algorithm is as follows:

```
function [wan,A18]=SW_angle(SWPivxTP,SWPivyTP,Eyex,Eyey);
%UNITS: milimeters and degrees
%%% VEHICLE DIMENSIONS
delta=306.1309; %Distance from SW pivot to SW rim
IPx=382.938; %Instrumentation Panel x-coordinate
IPy=736.85; %Instrumentation Panel y-coordinate
SWPC=243.0315; %Steering Wheel Pivot to Center distance.
SWAmin=13.518; %Steering wheel Tilt min angle
SWAmax=37.989; %Steering wheel Tilt max angle
SWArange=SWAmax-SWAmin;
SWdiameter=372.3; %W9=Steering wheel maximum outside diameter
%%% COMPUTATION
m=(Eyey-IPy)/(Eyex-IPx);
kappa=SWPivyTP-IPy-m*SWPivxTP+m*IPx;
INTERd=(-kappa+m*sqrt(m^2*delta^2+delta^2-kappa^2))/(m^2+1);
INTERy=SWPivyTP + INTERd;
INTERx=SWPivxTP + sqrt(delta^2-INTERd^2);
A18=(180/pi)*asin(INTERd/delta)-(180/pi)*atan( (SWdiameter/2) / SWPC);
wan=(A18-SWAmin)/SWArange;
```

The above disclosure describes example systems and methods for determining optimal lines of sight for a driver of the instrumentation panel and road. Other examples may be used without departing from the disclosure. For example, while the examples described above include determinations of a three-dimensional (3-D) position of the head of the driver, other embodiments may consider, in addition or in the alternative, for example, an angular direction of the head of the driver. The angular direction is the direction of the face of the driver and can be determined by the same and/or other sensing devices (e.g., camera(s)) used to determine the head and/or eye position of the driver.

While illustrated and discussed as a separate component, the master controller 220 and/or 470 may also be integrated with or substituted by the onboard computer system of the vehicle. While the present disclosure has been described in terms of particular preferred and alternative embodiments, it is not limited to those embodiments. Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:
1. An automatically-adjusting steering wheel system comprising:
   a steering wheel assembly;
   a head position sensor configured and arranged to detect a position of a head of a driver of a vehicle; and
   a master controller in communication with the head position sensor and the adjustable steering wheel assembly, wherein the master controller is configured to:
   receive input from the steering wheel assembly;
   receive input from the head position sensor;

determine an optimal line of sight of the driver defined by an interception point based on an intersection of:
(a) an arc defined by a plurality of top points of the steering wheel assembly, and
(b) a straight line defined by a position of at least one eye of the driver and a top point of an instrumentation panel;
adjust the steering wheel assembly based on the input from the steering wheel assembly and the input from the head position sensor; and
adjust the steering wheel assembly based on the optimal line of sight to provide the driver with unobstructed views of the instrumentation panel and a road.

2. The system according to claim 1, wherein the steering wheel assembly includes:
a steering wheel;
a steering column; and
an adjustment assembly configured to adjust the position of the steering wheel.

3. The system according to claim 2, wherein the position of the steering wheel includes at least one of the height, tilt angle, and proximity to driver.

4. The system according to claim 1, wherein the master controller, in being configured to adjust the steering wheel assembly, is configured to send a signal to the steering wheel assembly including information indicating a tilt angle of the steering wheel, height of the steering wheel and proximity of the steering wheel to the driver.

5. The system according to claim 1, wherein the master controller is further configured to determine the position of the head of the driver based on an angle of a side view mirror.

6. The system according to claim 1, wherein the head position sensor is further configured to determine the position of the at least one eye of the driver of the vehicle.

7. A method, for adjusting the position of a steering wheel system automatically, comprising:
receiving input from a steering wheel assembly, wherein the input includes information indicating a position of a steering wheel of the steering wheel assembly;
receiving input from a head position sensor, wherein the input indicates a position of a head of a driver;
determining an optimal line of sight of the driver defined by an interception point based on an intersection of:
(a) an arc defined by a plurality of top points of the steering wheel assembly, and
(b) a straight line defined by a position of at least one eye of the driver and a top point of an instrumentation panel; and
adjusting the steering wheel assembly based on the input from the steering wheel assembly, the input from the head position sensor, and the optimal line of sight to provide the driver with unobstructed views of the instrumentation panel and a road.

8. The method according to claim 7, wherein the position of the steering wheel includes at least one of the height, tilt angle, and proximity to driver.

9. The method according to claim 7, further comprising sending a signal to the steering wheel assembly including information indicating a tilt angle of the steering wheel, height of the steering wheel and proximity of the steering wheel to the driver.

10. The method according to claim 7, further comprising determining the position of the head of the driver based on an angle of a side view mirror.

11. The method according to claim 7, wherein the input from the head position sensor further indicates the position of the at least one eye of the driver of the vehicle.

12. A non-transitory computer-readable medium having stored thereon computer-executable instructions that, when executed by a processor, cause the processor to perform a method, comprising:
receiving input from a steering wheel assembly;
receiving input from a head position sensor;
determining an optimal line of sight of the driver defined by an interception point based on an intersection of:
(a) an arc defined by a plurality of top points of the steering wheel assembly, and
(b) a straight line defined by a position of at least one eye of the driver and a top point of an instrumentation panel; and
adjusting the steering wheel assembly based on the input from the steering wheel assembly, the input from the head position sensor, and the optimal line of sight to provide the driver with unobstructed views of the instrumentation panel and a road.

13. The non-transitory computer-readable medium according to claim 12, wherein the input from the steering wheel assembly includes information indicating a position of a steering wheel of the steering wheel assembly.

14. The non-transitory computer-readable medium according to claim 13, further comprising adjusting the tilt of the steering wheel to provide the driver the unobstructed view of the instrumentation panel and the road.

15. The non-transitory computer-readable medium according to claim 12, wherein the input from the head position sensor indicates the position of the head of the driver.

16. The non-transitory computer-readable medium according to claim 12, wherein the input from the head position sensor indicates the position of the at least one eye of the driver.

* * * * *